United States Patent [19]

Sasahara

[11] Patent Number: 5,457,753
[45] Date of Patent: Oct. 10, 1995

[54] IMAGE PROCESSING DEVICE FOR MICROFILM READER

[75] Inventor: Kenji Sasahara, Tokyo, Japan

[73] Assignee: Fuji Photo Film Co., Ltd., Kanagawa, Japan

[21] Appl. No.: 199,896

[22] Filed: Feb. 22, 1994

[30] Foreign Application Priority Data

Feb. 22, 1993 [JP] Japan .................................. 5-054580

[51] Int. Cl.⁶ .................................................. G06K 9/00
[52] U.S. Cl. .......................... 382/275; 348/112; 382/284; 382/311
[58] Field of Search ................................ 382/1; 348/112

[56] References Cited

U.S. PATENT DOCUMENTS

4,380,776  4/1983  Smith et al. ............................ 348/112
4,807,041  2/1989  Kishi et al. ............................ 348/112

Primary Examiner—Leo H. Boudreau
Attorney, Agent, or Firm—Sughrue, Mion, Zinn, Macpeak & Seas, Richard C. Turner

[57] ABSTRACT

An image processing device for a negative microfilm reader for easily and precisely designating areas of black frames to be erased. In a microfilm reader having an image reader for reading enlarged projection images of a negative microfilm, an image processor for processing image signals, and a display means for displaying the processed images with black and white reversed, the device comprises area input means for inputting the areas of black frames in the images displayed on the display; and a black frame erasing means for erasing the areas of black frames thus input on the display and outputting the required image with areas of black frame erased.

8 Claims, 9 Drawing Sheets

TEXT FORM

IMAGE PROCESSING DEVICE FOR MICROFILM READER

BACKGROUND OF THE INVENTION

1. Field of the Invention

The present invention relates to an image processing device for a microfilm reader, and particularly to an image processing device capable of erasing the black frames or marginal portions from an image which is read by the image reader from negative projection image of negative microfilm, to output thus processed image with the black frame erased.

2. Prior Art

There are known in the art an image processing devices, in which enlarged projection images of a microfilm are read with a CCD line sensor or an image sensor to perform predetermined image processing on such images, erase, mask or trim a part thereof, or edit plural images by combining them into a merged or synthesized image. In one type thereof, enlarged images projected from a negative microfilm are read by using a CCD line sensor or the like and the read image is displayed on a CRT with black and white reversed, so that black frames appear around the displayed images as marginal or peripheral portions of the frames of the microfilm. In this case it is necessary to erase such black frames.

Further, it may be desired that some images having predetermined form such as checks, bills, or resident cards are partially trimmed or cut off from the read image so that trimmed images are printed, transmitted through a facsimile machine, or transmitted to other image processing devices or external memory unit. In such cases, it would be convenient if such trimmed areas of the original images were merged into one image to output the merged image data so that the black frames of the original images can be automatically erased.

OBJECTS AND SUMMARY OF THE INVENTION

The present invention has been conceived in light of the above conditions, and a first object of the present invention is to provide an image processing device for a microfilm reader wherein the areas of black frames to be erased can be easily and accurately input or designated.

A second object of the present invention is to provide a device capable of not only erasing black frames on plural images in a predetermined form but also of extracting and combining particular areas of each images and combined to one image to output thus combined extracted images.

According to the present invention, the first object is achieved by the provision of an image processing device for a microfilm reader having image reading means for reading enlarged projection images of a negative microfilm and outputting image signals, image processing means for processing the image signals and outputting processed image data, and display means for displaying the processed images with black and white reversed, comprising: area input means for inputting therethrough an instruction for designating an area to be erased as a black frame in the displayed image on said display means; and black frame erasing means for erasing the area designated as the black frame from the processed image, displaying thus obtained image with black frame erased on said displaying means and outputting the image data with the areas of black frames erased.

The black frame areas to be erased are preferably input via a touch panel mounted on a display face or panel. Alternatively, the black frame areas to be erased may be designated or specified by using a mesh-screen displayed over the images.

The second object is achieved by adding image merging means for merging plural extracted images, which are extracted from a particular portion of plural projection images in a predetermined form, into one image according to a predetermined format.

DESCRIPTION OF THE PREFERRED EMBODIMENTS

Figure 1A:
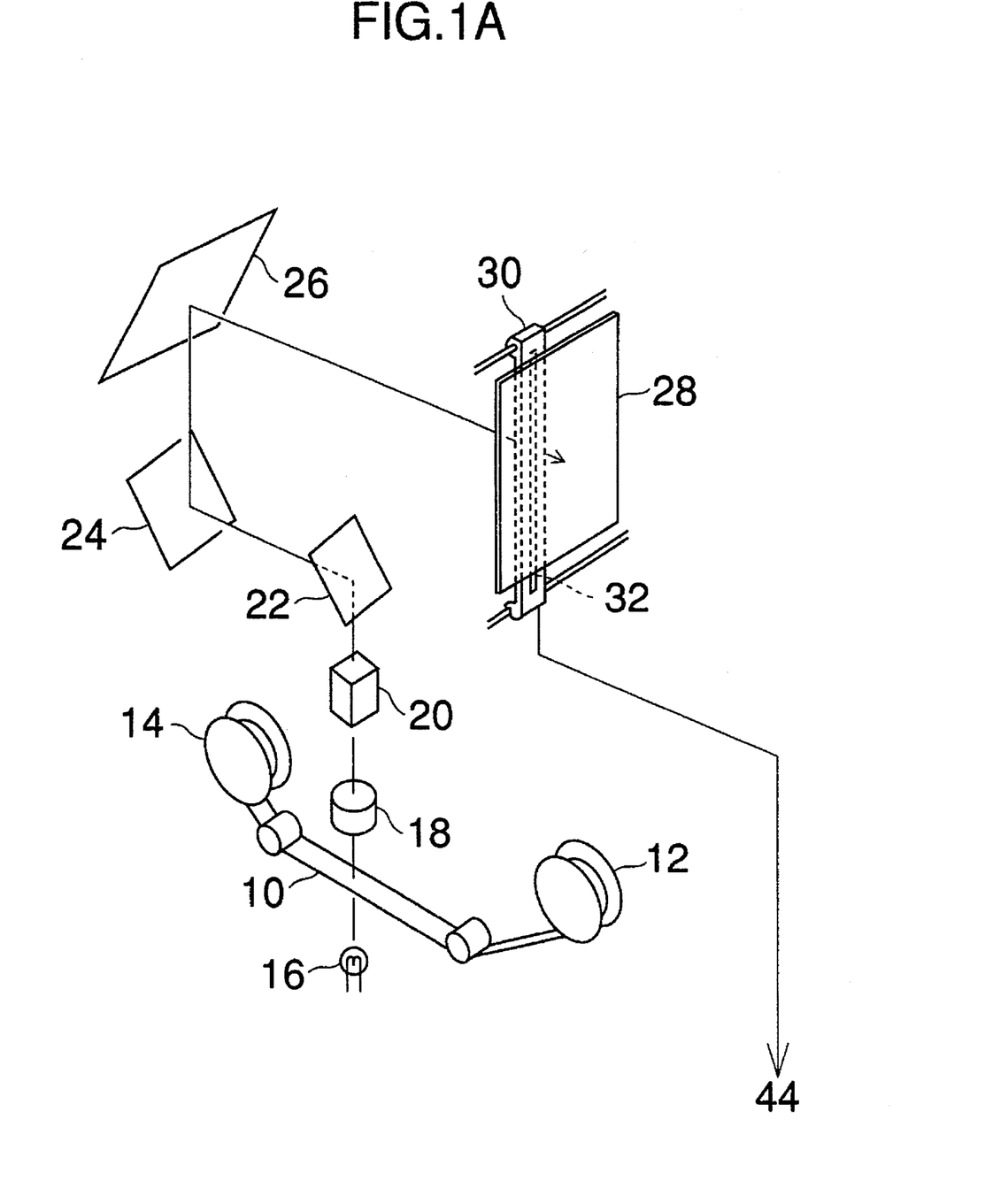
FIG. 1A is a schematic illustration showing a microfilm reader assembled in a first embodiment of the present invention.
Figure 1B:
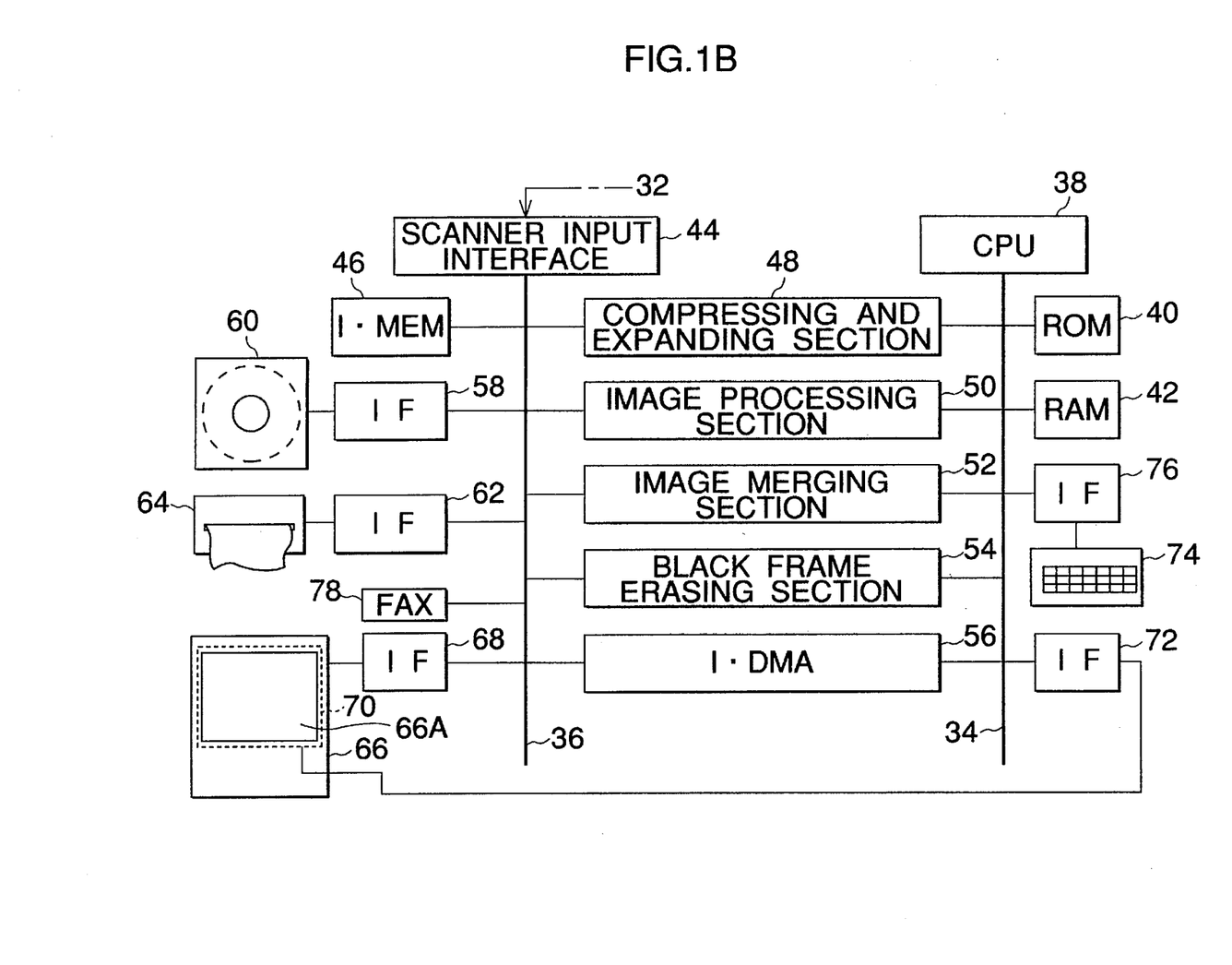
FIG. 1B is a block diagram showing the operation sequence of the first embodiment of the present invention.
Figure 2:
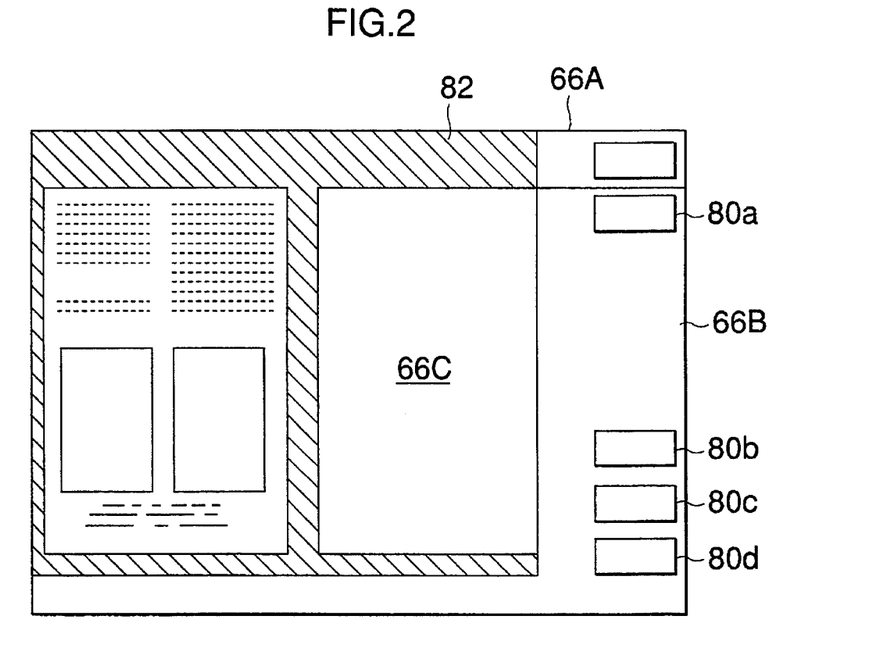
FIG. 2 is an Illustration showing an example of the figure displayed on the display screen before processing of the first embodiment of the present invention.
Figure 3:
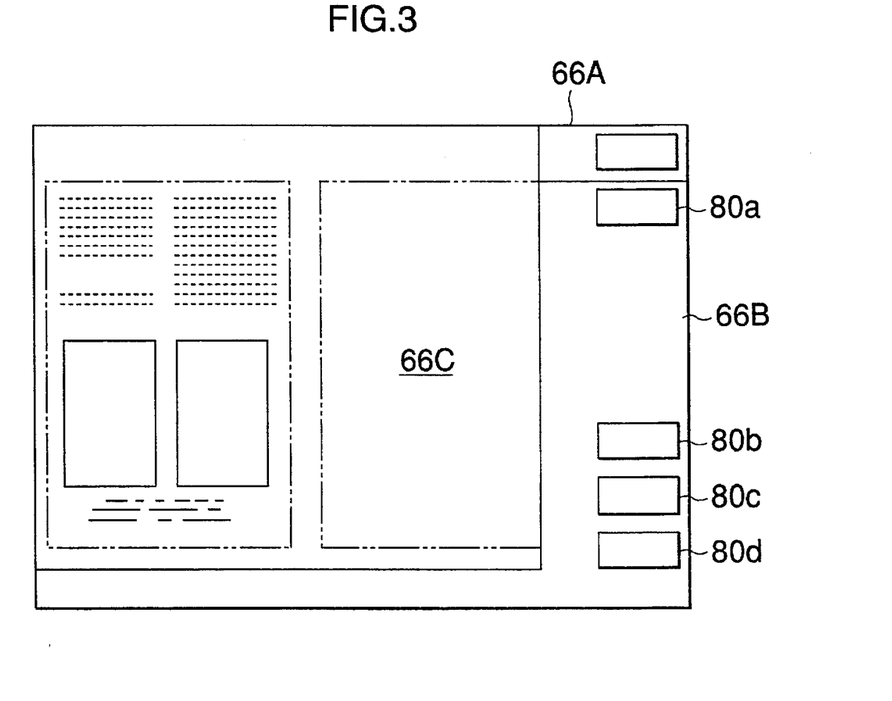
FIG. 3 is an illustration showing an example of the figure displayed on the display screen after the processing of the first embodiment of the present invention.

First Embodiment;

FIG. 1A shows the construction of a microfilm reader which is assembled in a first embodiment of the present invention. FIG. 1B shows a block diagram of the operation sequence of the first embodiment. FIG. 2 illustrates an example of the figure of a display face or screen before being subjected to a process for erasing black frames. FIG. 3 illustrates the figure of the display face or screen after being subjected to the process.

Initially, referring to FIG. 1A, reference numeral 10 designates a microfilm which runs between one reel 12 and another reel 14. The light from a light source 16 positioned below the film 10. The light passes through the film 10, and then passes through a projection lens 18, an image-rotating prism 20, and reflecting mirrors 22, 24, 26 to the rear surface of a screen 28. A movable plate 30 movable in the horizontal plane is disposed with an elongated rear side of the screen 28, and extends along the vertical plane, and a CCD line sensor 32 as image reading means is mounted on the movable plate 30 in the vertical direction thereof. The movable plate 30 and line sensor 32 constitute a scanner. With this construction, the image projected on the screen 28 can be read by reading the portions of image incident on the line sensor 32, while moving the movable plate 30 along the horizontal plane.

As shown in FIG. 1B, the system of the present embodiment has two data transfer buses 34 and 36, one bus 34 for a CPU and another bus 36 for image data. The CPU bus 34 is connected to CPU (central processing unit) 38, ROM 40, and RAM 42. The image data read by the line sensor 32 are converted into digital signals which are passed to various units through a scanner input interface (IF) 44 and the image data bus 36.

Reference numeral 46 designates a memory for image data (hereinafter referred to as "I-MEM"), which is a semiconductor memory device which can be written and read at high speed. This I-MEM 46 is connected to the bus 36, repeats the operations of processing the image data stored in one of the two image data storing sections and then transferring the processed image data to the other image data storing section.

Reference numeral 48 designates a compressing and expanding section which is connected to both buses 34, 36. The compressing and expanding section 48 compresses the read image data, for instance, prior to transfer the same to an external terminal unit, such as a facsimile machine or a microfilm reader, or expands to restore the data which have been transferred from an external terminal unit in the compressed state.

Reference numeral 50 designates an image processing section as the image processing means which is connected to both buses 34, 36. This image processing section 50 effects various spatial filtering processing, such as edge emphasizing, thinning or dithering through a differentiation processing, based on the original read data or processing for enlargement or contraction of images.

Reference numeral 52 designates an image merging section as the image merging means which extracts certain areas designated by the instruction through a touch panel 70 as the area input means (in details, to be described hereinafter) from among plural images in a fixed form; and which combines the areas thus extracted into one image in accordance with a predetermined format.

Reference numeral 54 designates a black frame erasing section for erasing a black portion at the periphery or margin of the image, in a manner such that the black frame region is turned to white. The touch panel 70, which will be described hereinafter, is used also for then input means for designating or defined the area to be erased as the black frame. Thus defined black frame areas are displayed with black and white reversed. It also performs a process of causing the defined black frame areas to turn to white to be output through a printer or the like.

Reference numeral 56 designates a control section for controlling data transfer (I-DMA, Image Direct Memory Access), and controls the transfers of data between various memories and various input or output interfaces or the direct transfer of data between a memory and another memory. In this embodiment, transfer of image data is effected through I-DMA system where image data are transferred without passing through the CPU 38. Thus, the CPU 38 does not need to perform any processing until the completion of transfer after the required parameters including the memory address for initiating transfer and the time of transfers are set on the I-DMA control section 56.

Reference numeral 58 designates a disk input/output interface which is interposed between the bus 36 and an external memory medium 60 such as an optical disk. Reference numeral 62 designates a printer output interface 25 which is interposed between a printer 64 and the bus 36.

Reference numeral 66 designates a CRT (cathode-ray tube, Braun tube) serving as the display means which is connected to the bus 36 through an interface 68. A transparent touch panel 70 is mounted over a display face or panel 66A of the CRT 66. The touch panel 70 constitutes the area input means and may be, for example, a thin-film resistors system.

The thin-film resistors system touch panel 70 includes two sheets of films each having a transparent resistor coating coated by evaporation. These two resistor coatings are opposed with each other so that the touch of a finger of the user or the like on the surface thereof causes the two resistor coatings to contact each other at that point (input point). Electrodes are provided on the opposing two peripheral edge sides of one thin-film resistor, and the opposing two peripheral edge sides of the other thin-film resistor, which are positioned orthogonally. When these two resistor coatings contact with each other upon touching of finger of the operator, the coordinates of the input point are detected from changes in the currents flown between the electrodes.

The touch panel 70 of the area input means may be of a type other than the thin-film resistors system, such as a light-pen type. The area input means may be a keyboard 74, a mouse for continuously moving a cursor on the screen 66A, or other pointing device.

Signals indicating-the areas or regions detected by the touch panel 70 are transferred to the bus 34 through the interface 72. The CPU 38 sends the signals indicating the areas extracted to the image merging section 52 if the areas have been extracted for image merging processing, and to the black frame erasing section 54 if the areas are defined as black frames to be erased.

Upon receipt of the signals indicating the designated or defined areas, the image merging section 52 causes the I-MEM 46 which is the memory means to store the images in those designated areas. When a predetermined number of images are extracted, it combines them into one image in accordance with a predetermined format and displays it on the CRT 66 or transmits it via a facsimile machine. When the signals indicating the areas are input as black frame areas to be erased, the black frame erasing section 54 displays the areas after changing the color of all thus designated and specified areas to white. In FIG. 1B, reference numeral 74 designates a keyboard; reference numeral 76 designates an interface thereof; and reference numeral 78 designates a facsimile machine.

Examples of the operation in the black frame erasing process will now be described with reference to FIGS. 2 and 3. The outer frames in the figures represent the display screen 66A of the CRT 66. The area inside the column 66B extending along the right-hand and lower sides of the screen 66A is an operation input portion wherein an "image read" key 80a, a "process switching" key 80b, an "erase" key 80c, an "end" key 80d and the like are provided. The black frame erasing process is selected by pushing the process switching key 80b on the screen preceding the screen 66A as shown in FIG. 2 and, if an image is read by operating the image read key 80*a*, the image appears in an area 66C in the display screen 66A other than the column 66B.

FIG. 2 shows such a state. In this figure, the shaded area represents a black frame 82 and the image of two pages of original document image surrounded by the black frame 82 is displayed. The image read at this stage may be an image which has been read from the negative microfilm 10 by the CCD line sensor 32 and stored in the memory 46. Alternatively, it may be an image read from an external memory medium 60 such as an optical disk. Further, it may be an image which has been sent from another image processing device connected to the CPU 38 over a telephone line or via a dedicated network.

Since the black frame erasing process in progress is shown in FIG. 2, when the area of the black frame 82 is input and designated as a region to be erased through an instruction from the touch panel 70, the color of thus designated area to be erased is converted from black to white. As a result, the area of the black frame 82 is erased when printing the image using the printer 64 or storing the same in the external memory unit 60. For example, rubbing the area of the black frame 82 in FIG. 2 with a finger causes black-to-white inversion in this area rendering it the same color as the background of the document image to erase it.

If the image merging or synthesizing process is selected, upon input of an instruction through the touch panel 70 to designated a particular area to be extracted (which is a trimmed area) from a document image in a predetermined form, the CPU 38 instructs to read the extracted area from the first image and to store the same in the memory 46. The CPU 38 outputs an instruction to read and extract the same particular area from each of images in the same form which are sequentially read to store these extracted areas in the memory 46 to store them. The image merging section 52 combines or merges a predetermined number of thus extracted areas into one image in accordance with a required format and output the image data of thus merged image to an appropriate output means as well as the display means 66 to display it.

In this embodiment, the keys 80*a* through 80*d* and the like are constituted by the touch panel 70 and the input of the area of the black frame 82 is also carried out using the touch panel 70. The present invention, however, may be modified so that the black frame area to be erased is input or designated by using other means.

Figure 4:
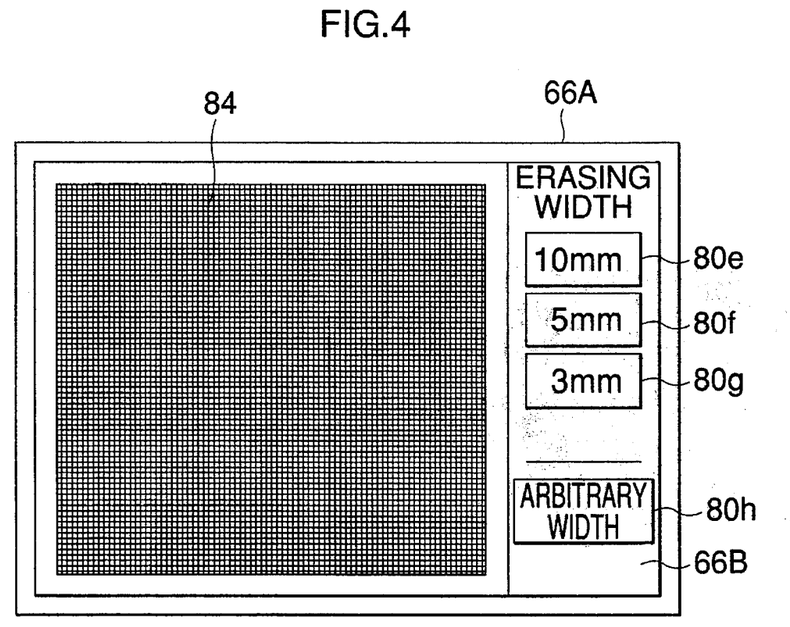
FIG. 4 is an illustration showing a method of designating black frame areas to be erased by a second embodiment of the present invention.

Second Embodiment:

FIG. 4 illustrates a method of inputting the black frame area to be erased using a mesh screen 84. According to this method, the image of the mesh 84 is displayed over an image on the display screen 66A, and the area of the black frame 82 is specified by straight lines in X and Y directions (i.e., horizontal and perpendicular directions) constituting the mesh screen.

According to this method, an erasure width is specified using black frame erasing width specification keys 80*e*, 80*f*, or 80*g* prepared in the input column 66B provided on the right-hand side of the display screen 66A. The keys 80*e*, 80*f*, and 80*g* are for inputting mesh size as erasure unit width of 10 mm, 5 mm, and 3 mm, respectively, and a push on any one of the keys causes the mesh 84 having the corresponding mesh size or meshed lines interval to appear on the screen 66A. Then, the areas or region to be erased as a black frame can be specified by using a pointing device. In details, by the pointing device such as the touch panel 70, any of the straight line in X direction within mesh 84 is designated and then either region upper or below the designated straight line in X direction is designated. Thus designated region is specified as a black frame to be erased along with the horizontal direction. Similarly, any of the straight line in Y direction within mesh 84 is designated and then any region is designated from either side of the right-hand or left-hand side of straight line in Y direction is designated. Thus designated region is also specified as a black frame to be erased along with the perpendicular direction.

The straight lines and regions may be designated or selected by using the pointing device such as the touch panel 70, the keyboard 74 or a mouse (not shown), in which an indicator such as a cursor (not shown) or a pointer is appeared on the screen 66A and moved to an edge of the area with thus pointing device.

When it is desirable to specify any dimension, other than mesh size specified by the keys 80*e*, 80*f*, and 80*g*, as the mesh size as the erasing width unit, an arbitrary width key 80*h* may be pushed to allow the dimension of the mesh size to be input using the keyboard 74 (see FIG. 1).

Figure 5:
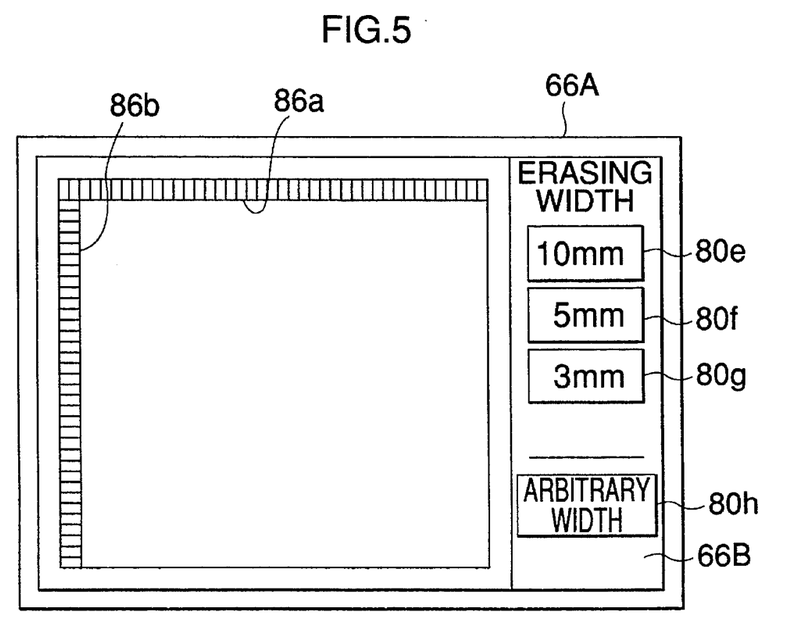
FIG. 5 is an illustration showing a method of designating black frame areas to be erased by a third embodiment of the present invention.

Third Embodiment:

FIG. 5 illustrates another method of inputting the black frame area to be erased wherein scales 86 (86*a*, 86*b*) are used. According to this method, the scales 86*a*, 86*b* are displayed over an image at the upper and left-hand side of the display screen 66A, and the coordinates specified can be input as the edge in the X or Y direction by specifying, through the instruction from the pointing device, the edge of the black frame 82 on the scales 86. Such specification may be carried out using the touch panel 70, a mouse, or the keyboard 74, as in the second embodiment.

The measure on the scales 86*a*, 86*b* may be specified as 10 mm, 5 mm, 3 mm, or an arbitrary value with the key 80*e*, 80*f*, 80*g* or 80*h*.

Figure 6:
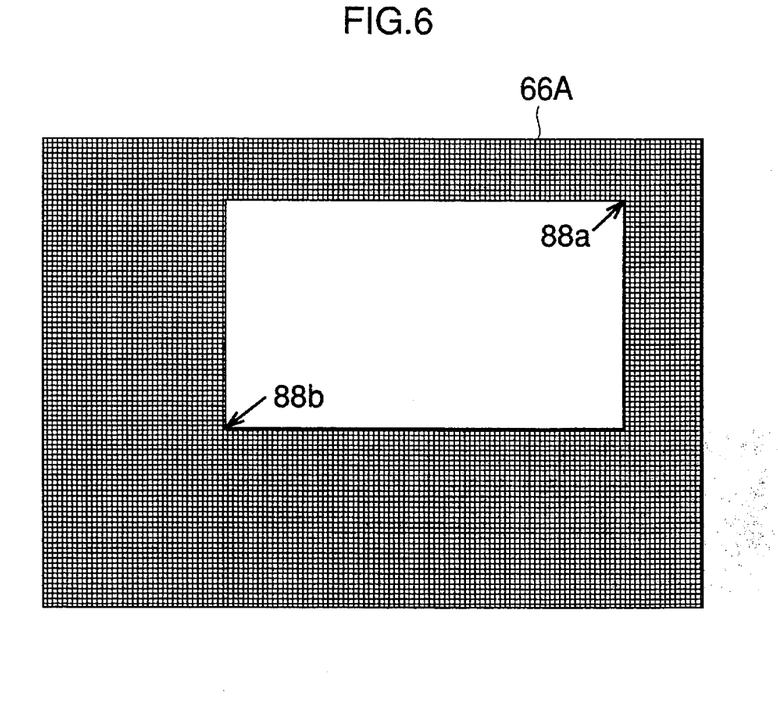
FIG. 6 is an illustration showing a method of designating black frame areas to be erased by a fourth embodiment of the present invention.

Fourth Embodiment:

FIG. 6 illustrates a method of inputting the area of the black frame 82 using the coordinates of diagonal points 88 (88*a*, 88*b*). According to this method, after one of the diagonal points 88*a* is input, the other diagonal point 88*b* is input to form a rectangle/square by way of the straight lines in X and Y directions (i.e., horizontal and perpendicular directions) including both of the diagonal points 88*a* and 88*b*, and the outside of this square can be specified as the black frame 82.

Figure 7:
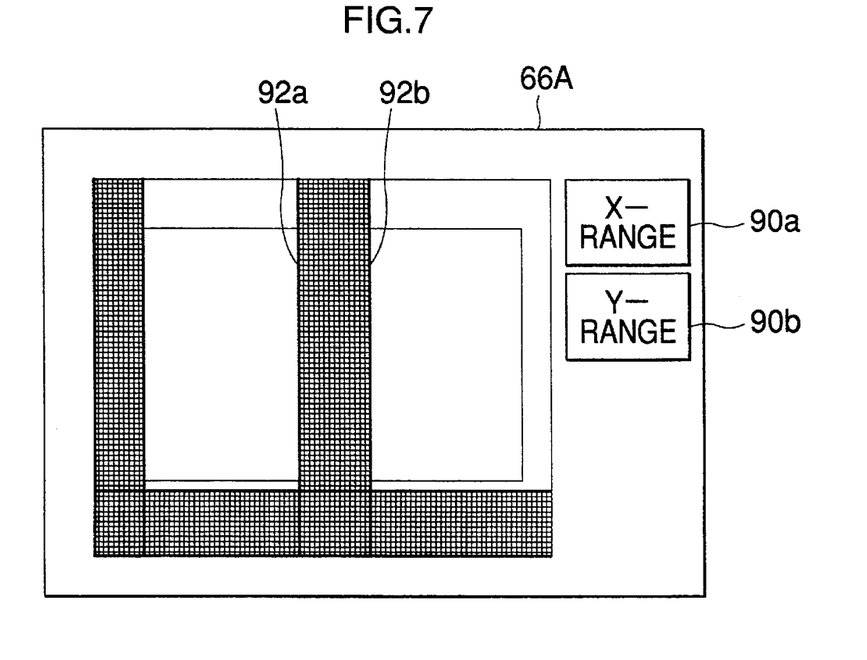
FIG. 7 is an illustration showing a method of designating black frame areas to be erased by a fifth embodiment of the present invention.

Fifth Embodiment:

FIG. 7 illustrates a method of inputting the black frame area to be erased by moving a pair of straight lines in X or Y direction. According to this method, when an X-range is specified using a key 90*a*, a pair of straight lines 92*a* and 92*b* extending in the direction of the Y-axis appear on the screen 66A.

An area in the X direction can be specified by moving the straight lines 92*a* and 92*b* in the X-direction using the touch panel, a mouse or the keyboard 74. Similarly, an area in the Y direction is specified using the key 90*b*. According to this method, a plurality of areas can be specified in the X and Y directions by pushing the keys 90*a* and 90*b* a plurality of times. This allows the black frames positioned between plural pages of the original document image to be designated as a erasing area, in a case that these plural pages of the original document images are simultaneously displayed and output as one image data.

Figure 8:
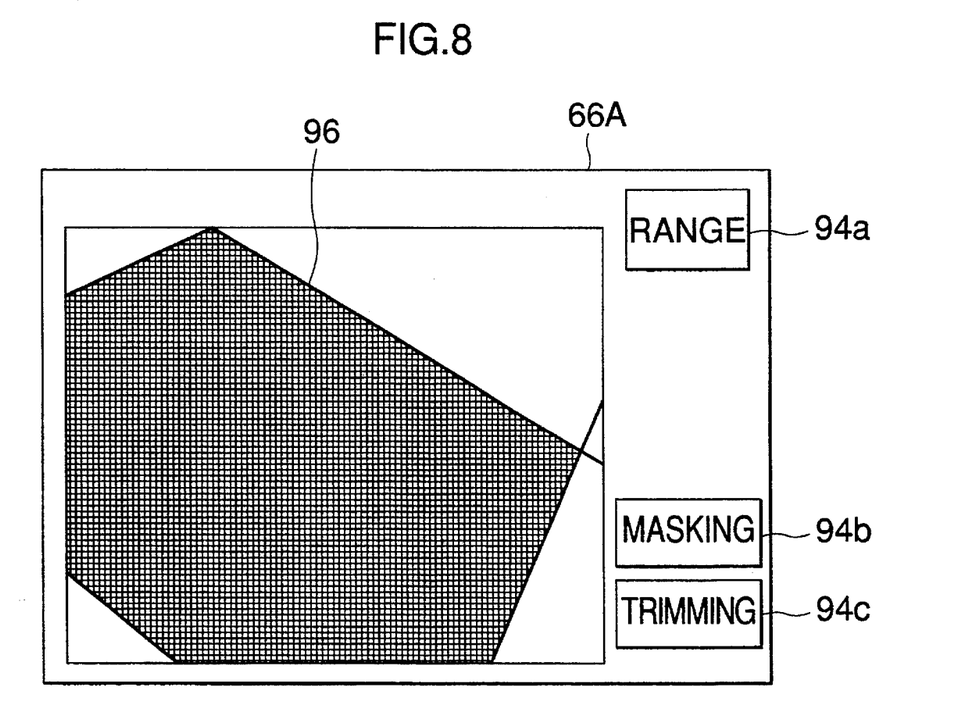
FIG. 8 is an illustration showing a method of designating an area having an arbitrary shape to be erased, according to a sixth embodiment of the present invention.

Sixth Embodiment:

FIG. 8 illustrates another input method wherein an area having an arbitrary shape can be specified. According to this method, a straight line 96 appears on the screen 66A when a range key 94*a* is selected. The straight line 96 overlaps one edge of the target area by changing the gradient and the length thereof. The target area having an arbitrary shape can be specified by repeating this operation.

To erase the area surrounded by a plurality of straight lines 94, a masking key 94b is selected. A trimming key 94c is selected to extract or trim this area and to erase the outside of the area surrounded by the straight lines 94. Erasure of the ares as a black frame may be performed by selecting the trimming key 94c.

Seventh Embodiment:

Various methods of inputting black frame areas have been described in the embodiments shown in FIGS. 4 through 8. A description will now be made of a method for extracting and merging or synthesizing particular areas which are extracted or trimmed from plural documents images in a predetermined form.

Figure 9:
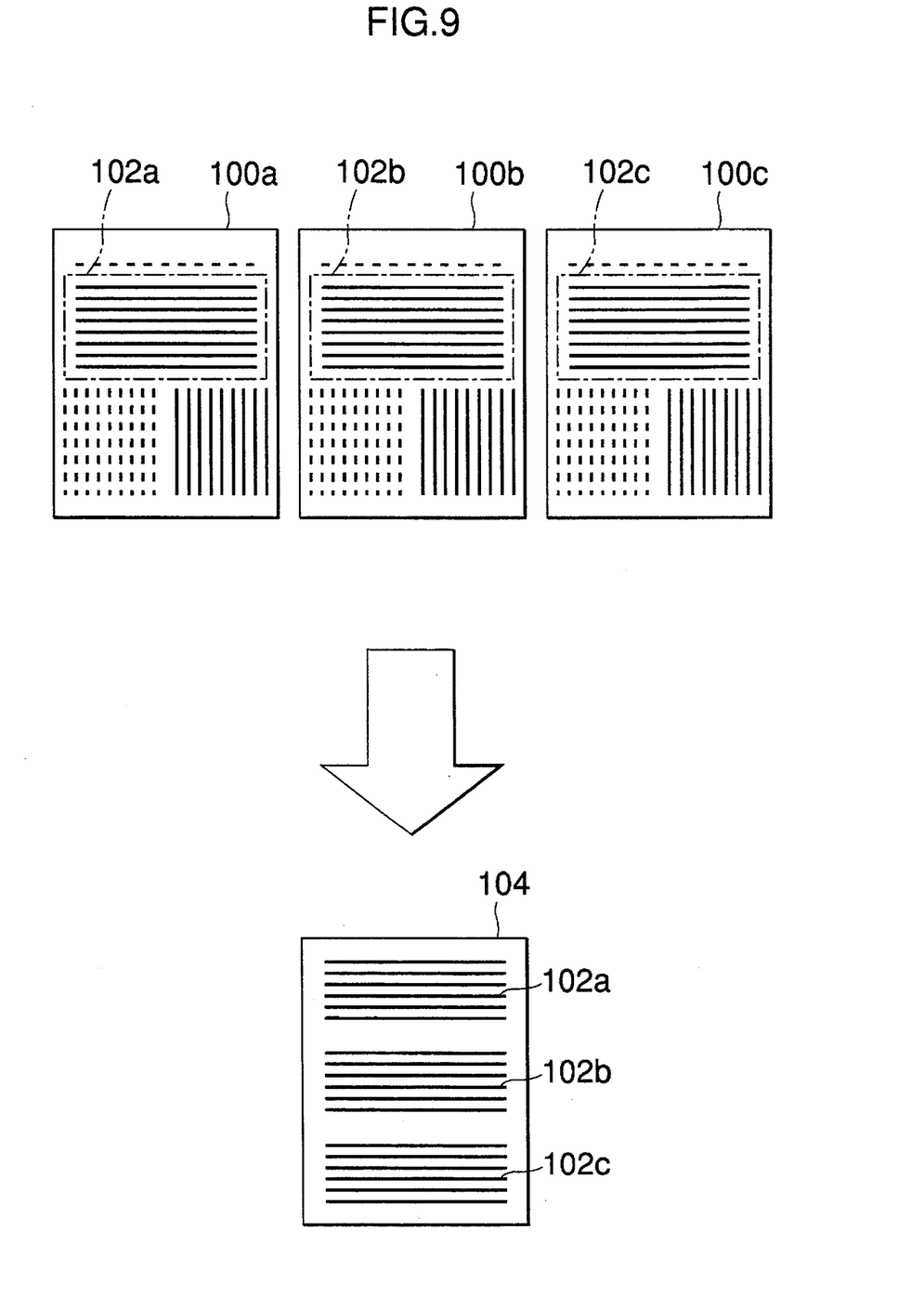
FIG. 9 is an illustration showing a method of merging extracted images, according to a seventh embodiment of the present invention.

According to the method illustrated in FIG. 9, particular areas or portions 102a, 102b, and 102c are extracted from plural projection images 100a, 100b, and 100c of a negative microfilm which has recorded these images as the same predetermined form. The areas (extracted areas or trimmed areas) 102a, 102b, and 102c can be designated or specified using the above-mentioned touch panel 70 or in accordance with the methods illustrated in FIGS. 4 through 8.

When the extraction of a predetermined number of images is complete, the image merging section 52 combines or merges the extracted images into one united image in accordance with a predetermined format, displays them on the display means 66 and outputs them as one synthesized image 104. In this embodiment, a certain number of extracted images 102a, 102b, and 102c are displayed and output in that order in the vertical direction. The extracted images may be enlarged at this stage.

Figure 10:
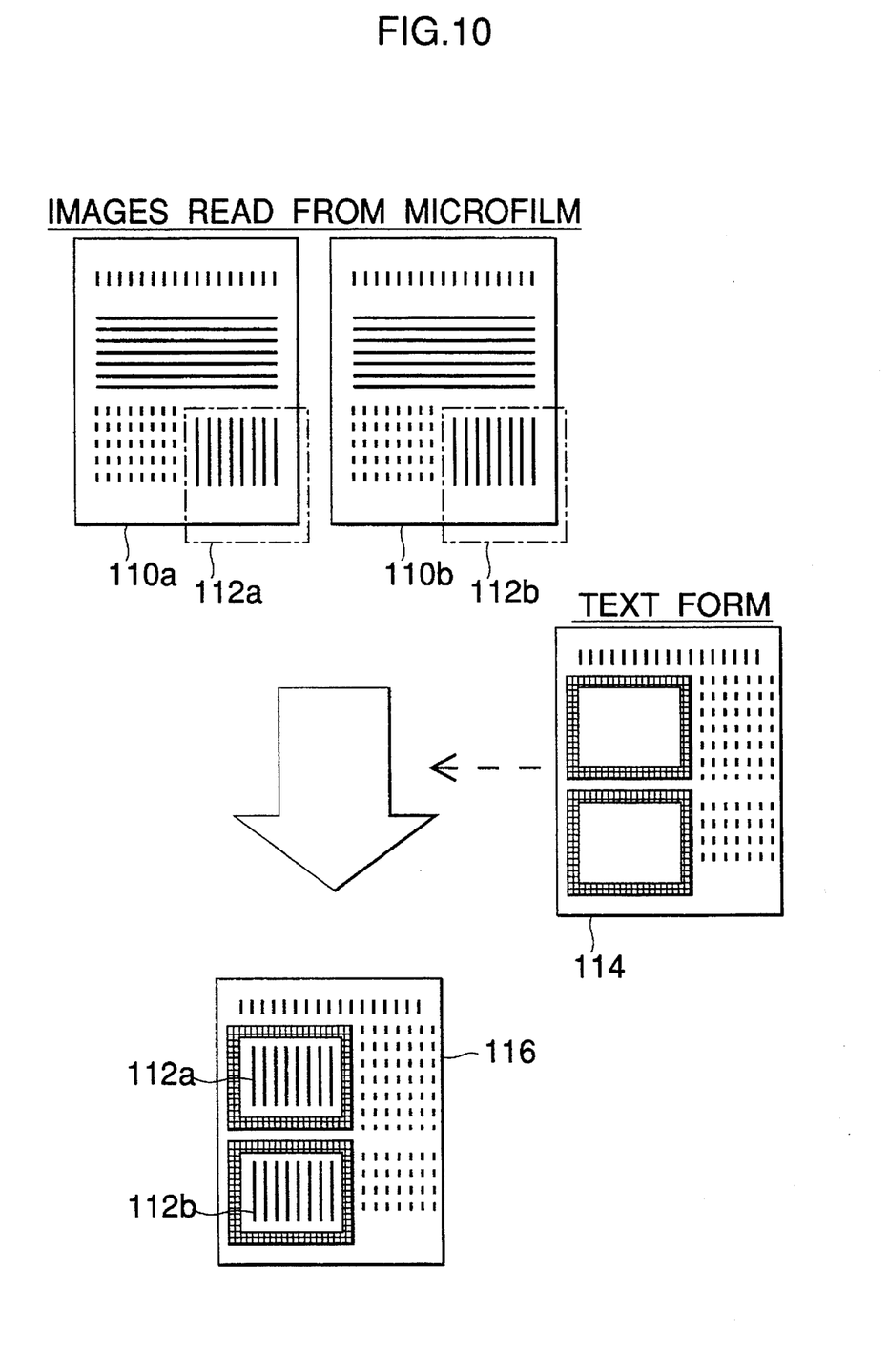
FIG. 10 is an illustration showing another method of merging extracted images, according to a eighth embodiment of the present invention.

Eighth Embodiment:

According to the method shown in FIG. 10, before extracting particular areas 112a and 112b from plural images 110a, and 110b of an original documents, a text form for outputting the combined images in predetermined format is input and stored in advance. The extracted areas 112a and 112b which have been read out are combined with this form 114 and a merged image 116 is output.

Figure 11:
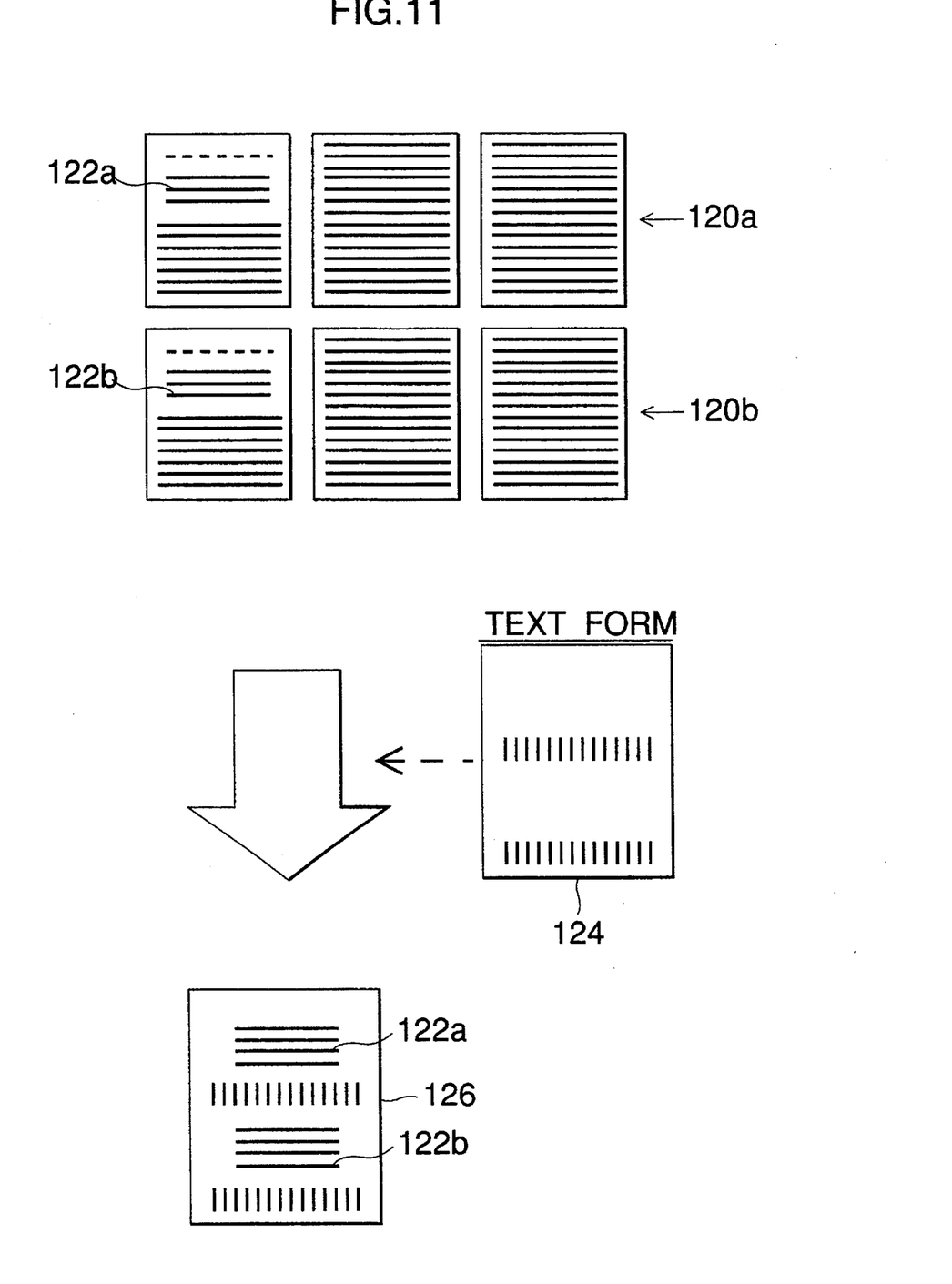
FIG. 11 is an illustration showing further method of merging extracted images, according to a ninth embodiment of the present invention.

Ninth Embodiment:

According to the method shown in FIG. 11, abstracts 122a and 122b which are present on predetermined pages of images 120a and 120b of an article or the like consisting of a plurality of pages are extracted and combined with a text form 124 in a predetermined format which has been prepared in advance to obtain a synthesized image 126. In this case, the size is preferably changeable, e.g. from the images of documents 120a and 120b in the A-4 size to the text form 124 in the B-4 size.

Other Embodiments:

Some original document images include both of characters and photographs. The images of such original documents have been read as binary images as a whole in a character mode. Thereafter, the areas of the photographs have been read again while checking them on a display screen. When the same images have been read again, only the areas of the photographs have been read as multinalized images in a photograph mode and have been synthesized to be output.

In this case, it is troublesome to input such photographic areas for each image. The area input means according to the present invention may be used to specify the photographic areas, and characters and photographs may be synthesized using the image merging means in which an image without photograph area may be used as text form for merging the images.

Two images may be overlapped when images are synthesized or merged. There has been a problem in that one of the images has been lost at the portion where the images overlap. According to the present invention, it is desirable to provide the image merging means with a function to synthesize two images by performing logical OR on the two images. As a result, for example, when some black characters overlap a black background image, only the portion of the characters overlapping the background are converted from black to white and the white characters thus can be clearly highlighted in the black background when they are output.

As described above, one aspect of the present invention is to input or designate black frame areas from enlarged projection images of a negative microfilm while monitoring the images thereof shown on a display means; and to display such images with the black frame areas erased. This allows easy and accurate input of the black frame areas with the images of such areas monitored on a display screen which is convenient to operate. Such area input means is preferably a touch panel, and such areas to be erased are designated by using a mesh on the display screen.

Further, addition of an image merging means which extracts particular areas from plural images in a predetermined form and combines the predetermined number of the extracted images into one merged image will conveniently allow the erasure of black frames and image synthesizing to be performed while the areas to be extracted are input using the black frame area input means.

While the present invention has been illustrated and described in connection with the preferred embodiments, it is not to be limited to the specific construction shown. It should be understood by those skilled in the art that various changes and modifications may be made without departing from the spirit and scope of the present invention as defined in the appended claims.

What is claimed is:

1. An image processing device for a microfilm reader having image reading means for reading enlarged projection images of a negative microfilm and outputting image signals, image processing means for processing the image signals and outputting processed image data, and display means for displaying an image from the processed image data with black and white reversed, comprising:

area input means for inputting therethrough an instruction for designating an area to be erased as a black frame in the displayed image on said display means; and black frame erasing means for erasing the area designated as the black frame from the image, displaying thus obtained image with black frame erased on said displaying means and outputting the image data with the area of black frame erased.

2. The image processing device for a microfilm reader according to claim 1, wherein said area input means is constituted by a touch panel overlaid on a display face of said display means.

3. The image processing device for the microfilm reader according to claim 1, wherein:

a mesh is displayed over the displayed image on a display screen of said display means, the mesh having meshed lines spaced at an interval designating an erasure width;

the area to be erased is a meshed area; and the interval and the meshed area are specified by the instruction from said area input means.

4. The image processing device for a microfilm reader according to claim 1, further comprising image merging means for merging plural extracted images, which are extracted, respectively, from a particular portion of plural projection images in a predetermined form, into one image.

5. The image processing device for a microfilm reader according to claim 4, wherein said plural extracted images are merged into one image having a predetermined format.

6. The image processing device for a microfilm reader according to claim 1, wherein said area input means is constituted by a keyboard.

7. The image processing device for a microfilm reader according to claim 1, wherein said area input means is constituted by a mouse.

8. The image processing device for a microfilm reader according to claim 1, wherein the area to be erased is designated by a plurality of straight lines, each of said straight lines having a gradient and length specified by the instruction from said area input means.

* * * * *